US012646276B2

(12) United States Patent
Zhang et al.

(10) Patent No.: US 12,646,276 B2
(45) Date of Patent: Jun. 2, 2026

(54) TRANSFORMING IMAGE INCLUDING NON-DIRECTIONAL OBJECT AND DIRECTIONAL OBJECT

(71) Applicant: GOOGLE LLC, Mountain View, CA (US)

(72) Inventors: Jiayang Zhang, Santa Clara, CA (US); Daniel Edmond Fish, Palo Alto, CA (US); Eric Baczuk, Palo Alto, CA (US); Lynn Tsai, Seattle, WA (US)

(73) Assignee: Google LLC, Mountain View, CA (US)

( * ) Notice: Subject to any disclaimer, the term of this patent is extended or adjusted under 35 U.S.C. 154(b) by 232 days.

(21) Appl. No.: 18/535,051

(22) Filed: Dec. 11, 2023

(65) Prior Publication Data

US 2024/0193895 A1 Jun. 13, 2024

Related U.S. Application Data

(60) Provisional application No. 63/386,804, filed on Dec. 9, 2022, provisional application No. 63/386,803, filed
(Continued)

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/013* (2013.01); *G06T 13/40* (2013.01); *G06T 2219/2016* (2013.01); *H04L 65/403* (2013.01)

(58) Field of Classification Search
CPC . G06T 19/20; G06T 13/40; G06T 2219/2016; G06F 3/013; H04L 65/403
See application file for complete search history.

(56) References Cited

U.S. PATENT DOCUMENTS

| | | |
|---|---|---|
| 2013/0010093 A1 | 1/2013 | Redmann |
| 2015/0169704 A1* | 6/2015 | Stekkelpak ........... G06F 16/951 |
| | | 715/765 |

(Continued)

OTHER PUBLICATIONS

"Using the Floating Window", https://help.autodesk.com/view/LUSTRE/2021/ENU/?guid=Lustre_UG_Stereoscopy_Using_the_Floating_Window_html, Sep. 5, 2022, 4 pages.
(Continued)

*Primary Examiner* — Chong Wu
(74) *Attorney, Agent, or Firm* — Brake Hughes Bellermann LLP

(57) ABSTRACT

A method of facilitating a virtual conference includes determining that a first object is non-directional, the first object being presented within an original image on a first display within the virtual conference; based on determining that the first object is non-directional, reversing an appearance and a location of the first object to generate a reversed first object; determining that a second object is directional, the second object being presented within the original image on the first display within the virtual conference; based on determining that the second object is directional, transferring a location of the second object while maintaining an orientation of the second object to generate a transferred second object; and causing a second display to generate a transformed image, the transformed image including the reversed first object and the transferred second object.

20 Claims, 16 Drawing Sheets

Related U.S. Application Data on Dec. 9, 2022, provisional application No. 63/386,800, filed on Dec. 9, 2022.

(51) Int. Cl.
  *G06T 13/40*      (2011.01)
  *H04L 65/403*     (2022.01)

(56)              References Cited

U.S. PATENT DOCUMENTS

| | | | |
|---|---|---|---|
| 2020/0322575 A1 | 10/2020 | Valli | |
| 2022/0182581 A1 | 6/2022 | Oz et al. | |
| 2023/0041678 A1* | 2/2023 | Swierk | G06F 21/16 |

OTHER PUBLICATIONS

Fuchs, et al., "Immersive 3D Telepresence", IEEE Computer Society, Jul. 2014, pp. 46-52.

* cited by examiner

First object
202

Second object
204

First
display
104A

Hello 312          314

316          318

Transferred
Second object
354

Second
display
104B

Reversed
First object
352

Hello 362          364

366          368

First user
102A

Eye
402B

Eye
402A

First
display
104A

412

First object
202

Second
object
204

414

Hello

416

422

420

418

First user
102A

First
display
104A

First object
202

Second object
204

Hello

Third object
602

Avatar
710

Display
704

Directional
input
720

Object
702

Avatar
710

Display
704

Object
702

TRANSFORMING IMAGE INCLUDING NON-DIRECTIONAL OBJECT AND DIRECTIONAL OBJECT

CROSS REFERENCE TO RELATED APPLICATIONS

This application claims the benefit and priority to U.S. Provisional Application No. 63/386,800, filed Dec. 9, 2022, U.S. Provisional Application No. 63/386,803, filed Dec. 9, 2022, and U.S. Provisional Application No. 63/386,804, filed Dec. 9, 2022, this disclosures of all of which are hereby incorporated by reference in their entireties.

TECHNICAL FIELD

This description relates to virtual conferences.

BACKGROUND

Users can participate in virtual conferences that present images that include a representation of another user and objects on a display.

SUMMARY

A virtual conference can be facilitated by presenting objects on displays viewed by the users as if the users were looking at each other through a window. An object in an upper-right portion of a first display viewed by a first user can be presented in an upper-left portion a second display viewed by a second user. The users can each view a representation of the other user, and the change to portions of the display that include the object can cause the users to appear to be looking at the same object in the window. For objects that are non-directional, in which direction of presentation can be changed while maintaining meaning of the objects, the objects can be reversed, so that corresponding portions of the objects appear to be in same portions of the window. For objects that are directional, in which direction of presentation would change the meaning of the objects, such as text, the locations of the objects can be transferred while maintaining orientation of the objects, preserving the meaning and/or ability to understand the objects.

According to an example, a method of facilitating a virtual conference includes determining that a first object is non-directional, the first object being presented within an original image on a first display within the virtual conference; based on determining that the first object is non-directional, reversing an appearance and a location of the first object to generate a reversed first object; determining that a second object is directional, the second object being presented within the original image on the first display within the virtual conference; based on determining that the second object is directional, transferring a location of the second object while maintaining an orientation of the second object to generate a transferred second object; and causing a second display to generate a transformed image, the transformed image including the reversed first object and the transferred second object.

According to an example, a non-transitory computer-readable storage medium comprises instructions stored thereon for facilitating a virtual conference. The instructions, when executed by at least one processor, are configured to cause a computing device to determine that a first object is non-directional, the first object being presented within an original image on a first display within the virtual conference; based on determining that the first object is non-directional, reverse an appearance and a location of the first object to generate a reversed first object; determine that a second object is directional, the second object being presented within the original image on the first display within the virtual conference; based on determining that the second object is directional, transfer a location of the second object without reversing the second object to generate a transferred second object; and cause a second display to generate a transformed image, the transformed image including the reversed first object and the transferred second object.

According to an example, a computing device includes at least one processor and a non-transitory computer-readable storage medium comprises instructions stored thereon that. When executed by the at least one processor, the instructions are configured to cause the computing device to determine that a first object is non-directional, the first object being presented within an original image on a first display; based on determining that the first object is non-directional, reverse an appearance and a location of the first object to generate a reversed first object; determine that a second object is directional, the second object being presented within the original image on the first display; based on determining that the second object is directional, transfer a location of the second object without reversing the second object to generate a transferred second object; and cause a second display to generate a transformed image, the transformed image including the reversed first object and the transferred second object.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Figure 1:
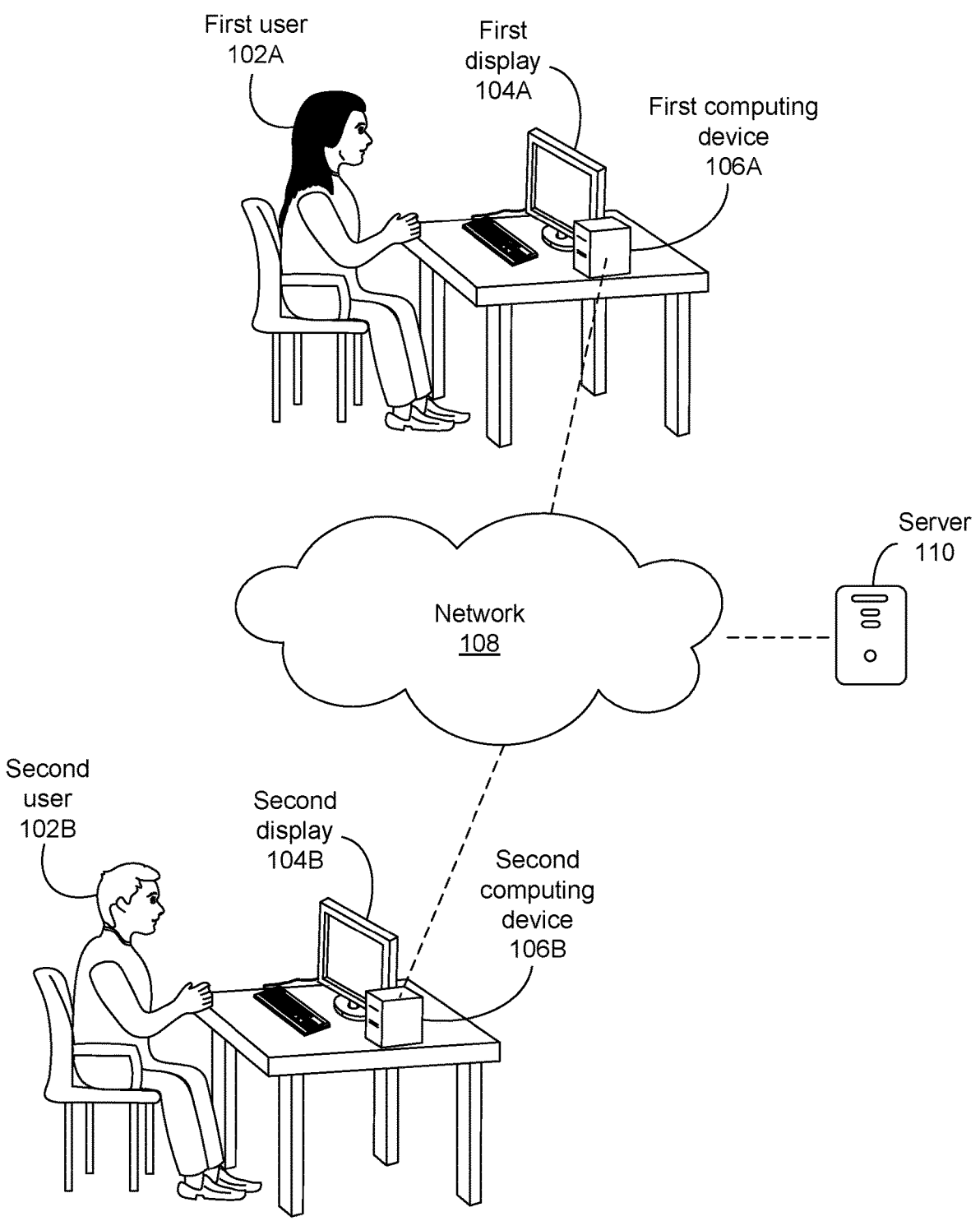
FIG. 1 is a network diagram showing a first computing device and a second computing device that are associated with a virtual conference.

Virtual conferences can include presenting common objects on displays that are associated with users who are in locations that are remote from each other. The displays can present, to the respective associated users, representations of the other user as well as the common objects. The displays can present the representation of the other user and the common objects as if the users were looking at each other through a clear window or glass. Locations of the common objects can be transferred between left and right portions of the respective displays so that, when viewed by respective users on their respective displays, the common objects will appear to be in the same location on the display or glass. For example, if an object is presented in an upper-left portion of a first display that is associated with and/or viewed by a first user, the object will be presented in an upper-right portion of a second display that is associated with and/or viewed by a second user. If the first user looks and/or points at the object in the upper-left portion of the first display, the second display will present a representation of the first user pointing toward the upper-right portion of the second display, where the object is presented within the second display. The virtual conference is facilitated by presenting locations toward which a user is looking and/or pointing that are consistent with locations of objects toward which the user is looking and/or pointing.

A technical problem with transferring locations between left and right portions of the display is that for directional objects, such as text, reversing an appearance of the object will cause a meaning or understandability of the object to change, whereas for non-directional objects, in which the meaning of the object is not tied to a sequence of symbols, presenting the object at a different location without reversing the appearance could result in a representation of a user appearing to point or look at a different part of the object than the user is intending to point or look at. For example, if a boat in an upper-left portion of a first display associated with a first user is floating to the right along the first display, and the first user points to the left-most portion of the boat, which is the rear portion of the boat, and a second display associated with a second user presented the boat on an upper-right portion of the second display without reversing the appearance of the boat, so the boat still appeared to be floating to the right, and the second display presented a representation of the first user as pointing to a right-most portion of the boat, then the second display would present the representation of the first user as pointing to the right-most portion of the boat.

A technical solution to this technical problem of transferring locations between left and right portions of first and second displays is to determine whether the object presented by the first display is a directional object or a non-directional object. If the object presented by the first display is a non-directional object, then both the appearance and location of the object will be reversed to generate a reversed object to be presented by the second display. If the object presented by the first display is a directional object, then the location of the object will be transferred without flipping the object, and/or while maintaining an orientation of the object, for presentation by the second display. A technical benefit to this technical solution is presenting objects on displays of remote users participating in a virtual conference as if the users were viewing each other through clear glass or a window, with objects on the clear glass or window, and maintaining comprehensibility of the objects and portions of the objects to which the users are looking and/or pointing.

FIG. 1 is a network diagram showing a first computing device 106A and a second computing device 106B that are associated with a virtual conference. A virtual conference can be a meeting between multiple users, such as a first user 102A interacting with the first computing device 106A and a second user 102B interacting with the second computing device 106B. The first computing device 106A can present, via a first display 104A associated with and/or coupled to the first computing device 106A, a representation of the second user 102B and any common objects viewed by both the first user 102A and the second user 102B, and the second computing device 106B can present, via a second display 104B associated with and/or coupled to the second computing device 106B, a representation of the first user 102A and any common objects viewed by both the first user 102A and the second user 102B.

The first computing device 106A and second computing device 106B can communicate with each other via a network 108. In some examples, the first computing device 106A and second computing device 106B communicate with each other in a peer-to-peer manner, with one or both generating and sending the representations of the users 102A, 102B and common objects for display on one or both of the computing devices 106A, 106B to the other computing device 106A, 106B. In some examples, the first computing device 106A communicates with a server 110 and the second computing device 106B communicates with the server 110, and the server 110 generates and sends representations of the users 102A, 102B and common objects for display by the displays 104A, 104B associated with and/or coupled to the computing devices 106A, 106B to the computing devices 106A, 106B. The network 108 can include a wide area network (WAN) such as the Internet, a local area network (LAN) such as Institute for Electrical and Electronics Engineers (IEEE) 802.3 ("Ethernet") or IEEE 802.11 ("Wireless Fidelity"), or a peer-to-peer communication protocol established between the computing devices 106A, 106B, as non-limiting examples.

The respective computing devices 106A, 106B can include input devices such as cameras that capture images of the respective users 102A, 102B. Any of the computing devices 106A, 106B and/or server 110 can generate representations of the users, which can be considered avatars, based on the images of the respective users 102A, 102B. The representations of the users 102A, 102B can include facial features such as eyes that indicate a direction that the respective user 102A, 102B is looking, a mouth indicating whether the respective user 102A, 102B is talking, and/or arms or hands indicating whether and/or a direction that the respective user 102A, 102B is pointing. In some examples, the respective computing devices 106A, 106B include input devices such as microphones that capture audio input such as works and/or speech spoken by the respective users 102A, 102B.

Figure 2:
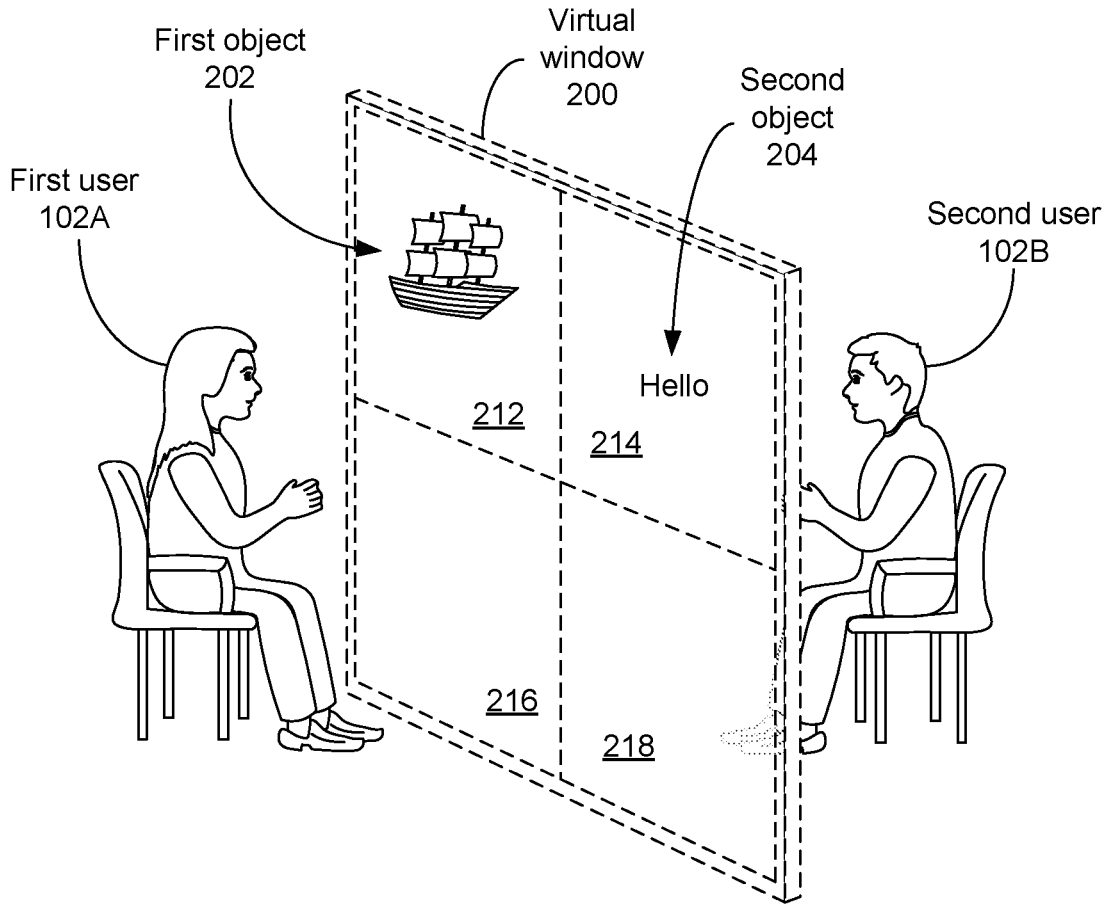
FIG. 2 shows a first user and a second user participating in a virtual conference via a virtual window.

FIG. 2 shows the first user 102A and the second user 102B participating in a virtual conference via a virtual window 200. The virtual window 200 is a representation of the first display 104A viewed by the first user 102A and the second display 104B viewed by the second user 102B. The virtual window 200 is not drawn to scale.

The first user 102A views the second user 102B, and/or a representation of the second user 102B, within the first display 104A (not labeled in FIG. 2) represented by the virtual window 200, as if the first user 102A were viewing the second user 102B through a clear window or glass. The virtual window 200 and/or first display 104A presents a first object 202 to the first user 102A. In the example of FIG. 2, the virtual window 200 and/or first display 104A presents the first object 202 within an upper-left section 212 and/or quadrant of the virtual window 200 and/or first display 104A. The virtual window 200 and/or first display 104A presents a second object 204 to the first user 102A. the first and second objects 202, 204 can be considered common objects within the virtual conference. In the example of FIG. 2, the virtual window 200 and/or first display 104A presents the second object 204 within an upper-right section 214 and/or quadrant of the virtual window 200 and/or first display 104A. The upper-right section 214 and/or quadrant, and/or a lower-right section 218 and/or quadrant, quadrant of the virtual window 200 and/or first display 104A, can present portions of the representation of the second user 102B. In the example shown in FIG. 2, a lower-left section 216 and/or quadrant of the virtual window 200 and/or first display 104A does not present any objects.

The second user 102B views the first user 102A, and/or a representation of the first user 102A, within the second display 104B (not labeled in FIG. 2) represented by the virtual window 200, as if the second user 102B were viewing the first user 102A through a clear window or glass. The virtual window 200 and/or second display 104B presents the first object 202 to the second user 102B within an upper-right section (not labeled for clarity purposes) and/or quadrant of the virtual window 200 and/or second display 104B. The virtual window 200 and/or second display 104B presents the second object 204 within an upper-left section (not labeled for clarity purposes) and/or quadrant of the virtual window 200 and/or second display 104B. The upper-right section (not labeled for clarity purposes) and/or quadrant, and/or a lower-right section (not labeled for clarity purposes) and/or quadrant, of the virtual window 200 and/or second display 104B, can present portions of the representation of the first user 102A. In the example shown in FIG. 2, a lower-left section (not labeled for clarity purposes) and/or quadrant of the virtual window 200 and/or second display 104B does not present any objects to the second user 102B.

While FIG. 2 shows the virtual window 200 and/or first display 104A divided into four sections 212, 214, 216, 218, which can be considered quadrants, the virtual window 200 and/or displays 104A, 104B can be divided into any number of sections. Locations of objects, such as the first object 202 and second object 204, can be transferred to sections in a remote display that have a same vertical (or 'y') location, but an opposite horizontal (or 'x') location, as the object has in the local display. In some examples, the horizontal or x value of the object is reversed or inverted. If a horizontal or x value of pixels is zero (0) through a center of the display, then the horizontal or x value of the object can be reversed or inverted by multiplying the horizontal or x value by negative one (−1). If the horizontal or x values is zero (0) at one side and/or end of the display, then the horizontal or x value of the object can be reversed or inverted by subtracting the horizontal or x value from a predetermined and/or maximum horizontal or x value (such as the number of columns of pixels in the display).

The first computing device 106A, second computing device 106B, and/or server 110 can determine whether an object, such as the first object 202 and/or the second object 204, is directional or non-directional. A directional object can be considered an object for which the direction of presentation impacts meaning or comprehension of the object, such as text or any sequence of symbols that are interpreted in a particular order. A non-directional object can be considered an object for which the direction of presentation does not impact the meaning or comprehension of the object, such as images or representations of physical objects that can be reversed or flipped and still be understood to represent the same object. In some examples, the first computing device 106A, second computing device 106B, and/or server 110 can determine whether an object is directional or non-directional based on a category of the object, such as determining that a text object is directional and a non-text object is non-directional. In some examples, the first computing device 106A, second computing device 106B, and/or server 110 can determine whether an object, such as the first object 202 and/or the second object 204, is directional or non-directional by comparing the object to similar images stored in a database. If the first computing device 106A, second computing device 106B, and/or server 110 finds similar images in the database and a threshold proportion, such as at least ninety percent (90%) are all in the same order as the object, then the object can be considered directional, whereas if similar images in the database are often reversed (such as a threshold proportion such as at least thirty percent (30%)), then the object can be considered non-directional. In some examples, the first computing device 106A, second computing device 106B, and/or server 110 can compare constituent parts of the object, such as characters or symbols, to images stored in the database. If the first computing device 106A, second computing device 106B, and/or server 110 finds similar images in the database and a threshold proportion, such as at least ninety percent (90%) are all in the same order as the constituent parts of the object, then the object can be considered directional, whereas if images in the database that are similar to the constituent parts are often reversed (such as a threshold proportion such as at least thirty percent (30%)), then the object can be considered non-directional. In some examples, the first computing device 106A, second computing device 106B, and/or server 110 can determine whether similar images are frequently reversed in a drawing program, and if a threshold proportion, such as thirty percent (30%), of similar images are reversed within the drawing program, then the object can be considered non-directional, whereas if similar images are rarely reversed, such as fewer then a threshold proportion such as ten percent (10%) are reversed, then the object can be considered directional.

In the example shown in FIG. 2, the first object 202, a boat, is considered non-directional because the first object 202 can be reversed and/or flipped while retaining a meaning or understanding of the first object 202. In the example shown in FIG. 2, the second object 204, text ("Hello"), is considered directional because the second object 204 cannot be reversed or flipped without losing meaning or understanding of the second object 204 (reversing or flipping the letters would make the word difficult to read). Based on the first object 202 being non-directional, the first object 202 can be flipped and/or reversed when presented to the second user 102B on the second display 104B. Based on the second object 204 being directional, the second object 204 can have a location transferred while maintaining and orientation of, and/or without flipping or reversing, the second object 204.

Figure 3A:
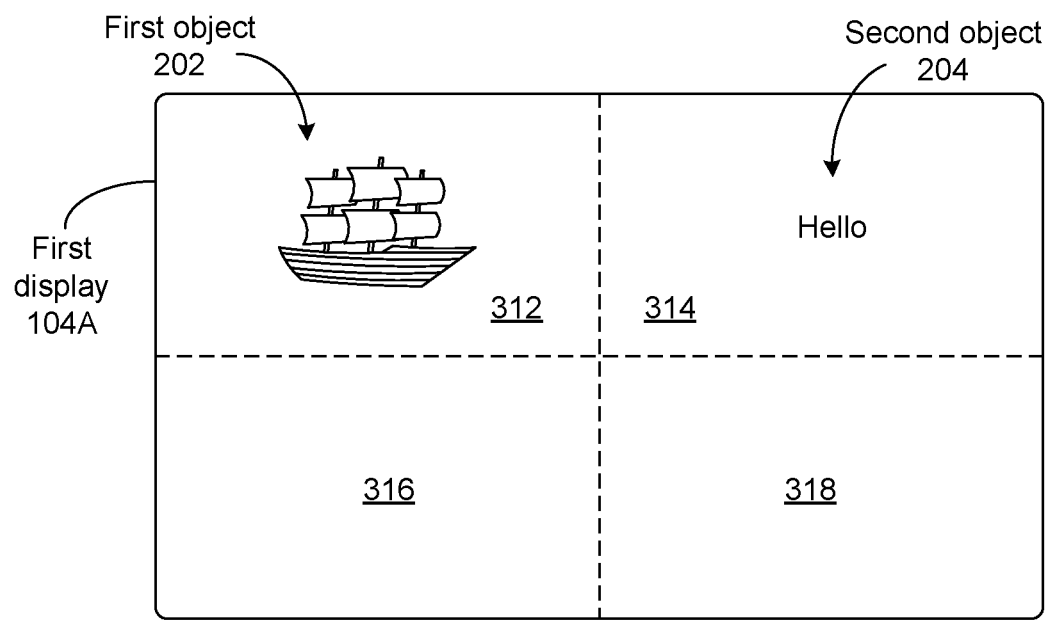
FIG. 3A shows a first display presenting objects during the virtual conference.

FIG. 3A shows the first display 104A presenting objects 202, 204 during the virtual conference. In the example of FIG. 3A, the first object 202 is non-directional. The first object 202 is located in an upper-left section 312 and/or quadrant of the first display 104A. In the example shown in FIG. 3A, the second object 204 is directional. The second object 204 is located in an upper-right section 314 and/or quadrant of the first display 104A. In this example, a third section 316 and/or quadrant is empty and a fourth section 318 and/or quadrant is empty. The image presented by the first display 104A, as shown in FIG. 3A, can be considered an original image.

When the objects 202, 204 are presented to the second user 102B (not shown) within the second display 104B (not shown), the location of the first object 202 will be reversed and the appearance of the first object 202 will be reversed because the first object 202 is non-directional. The location of the second object 204 will be reversed and/or transferred to a location with an opposite horizontal value, but the orientation of the second object 204 will be maintained, and/or the appearance of the second object 204 will not be reversed and/or flipped, because the second object 204 is directional.

Figure 3B:
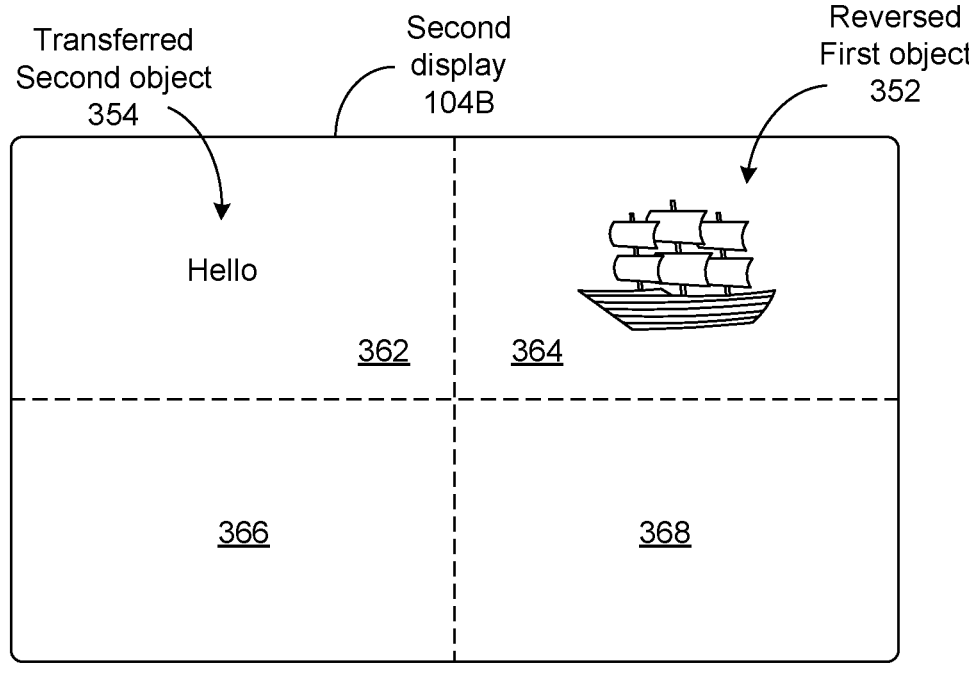
FIG. 3B shows a second display presenting objects during the virtual conference.

FIG. 3B shows the second display 104B presenting objects 352, 354 during the virtual conference. The second display 104B is presenting objects 352, 354. The objects are transformed versions of the objects 202, 204 shown and described with respect to FIG. 3A. A reversed first object 352 is a transformed version of the first object 202. A transferred second object 354 is a transformed version of the second object 204. The transferred second object 354 has had a location of the transferred second object transferred. The image presented by the second display 104B, as shown in FIG. 3B, can be considered a transformed image.

Based on the first object 202 being non-directional, the appearance and location of the first object 202 have been reversed. Based on the first object 202 being presented within the upper-left section 312 in the first display 104A, the reversed first object 352 is presented within an upper-right section 364 of the second display 104B. Based on the first object 202 being non-directional, the appearance of the second object 204 is reversed, so that the reversed first object 352 is facing left, whereas the first object 202 was facing right. Based on the second object 204 being directional, the location of the second object 204 has been reversed but the appearance of the second object 204 has been maintained and/or has not been reversed. Based on the second object 204 being presented within the upper-right section 314 of the first display 104A, the transferred second object 354 is presented within an upper-left section 362 of the second display 104B.

Based on the lower-left section 316 and/or quadrant in the first display 104A being empty, a lower-right section 368 and/or quadrant in the second display 104B is empty. Based on the lower-right section 318 and/or quadrant in the first display 104A being empty, a lower-left section 366 and/or quadrant in the second display 104B is empty.

The computing devices 106A, 106B can track eyes of the users 102A, 102B that are associated with the respective computing devices 106A, 106B. Based on tracking the eyes of the users 102A, 102B that are associated with the respective computing devices 106A, 106B, the first computing device 106A, second computing device 106B can determine directions of gazes of the users 102A, 102B. Based on determining the directions of the gazes, the computing devices 106A, 106B can cause the displays 104A, 104B to present representations of the users 102A, 102B (such as avatars) that are looking in the same directions as, and/or looking at the same objects as, the users 102A, 102B.

Figure 4A:
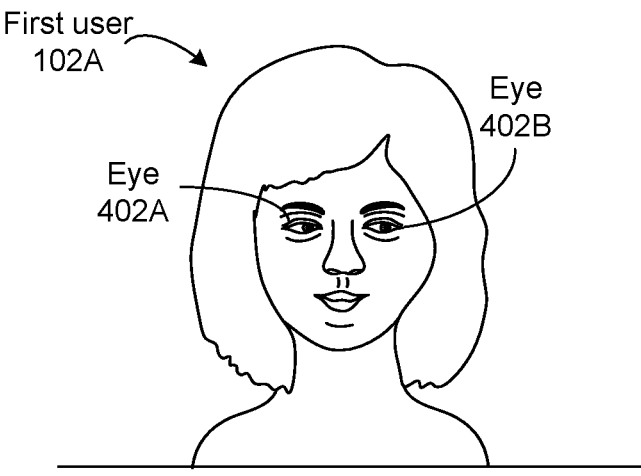
FIG. 4A shows the first user looking at an object that is up and to the left with respect to the first user.

FIG. 4A shows the first user 102A looking at an object (not shown) that is up and to the left with respect to the first user 102A. FIG. 4A shows a face of the first user 102A, including eyes 402A, 402B of the first user 102A. The eyes 402A, 402B of the first user 102A indicate that the first user 102A is looking up and to the left.

Figure 4B:
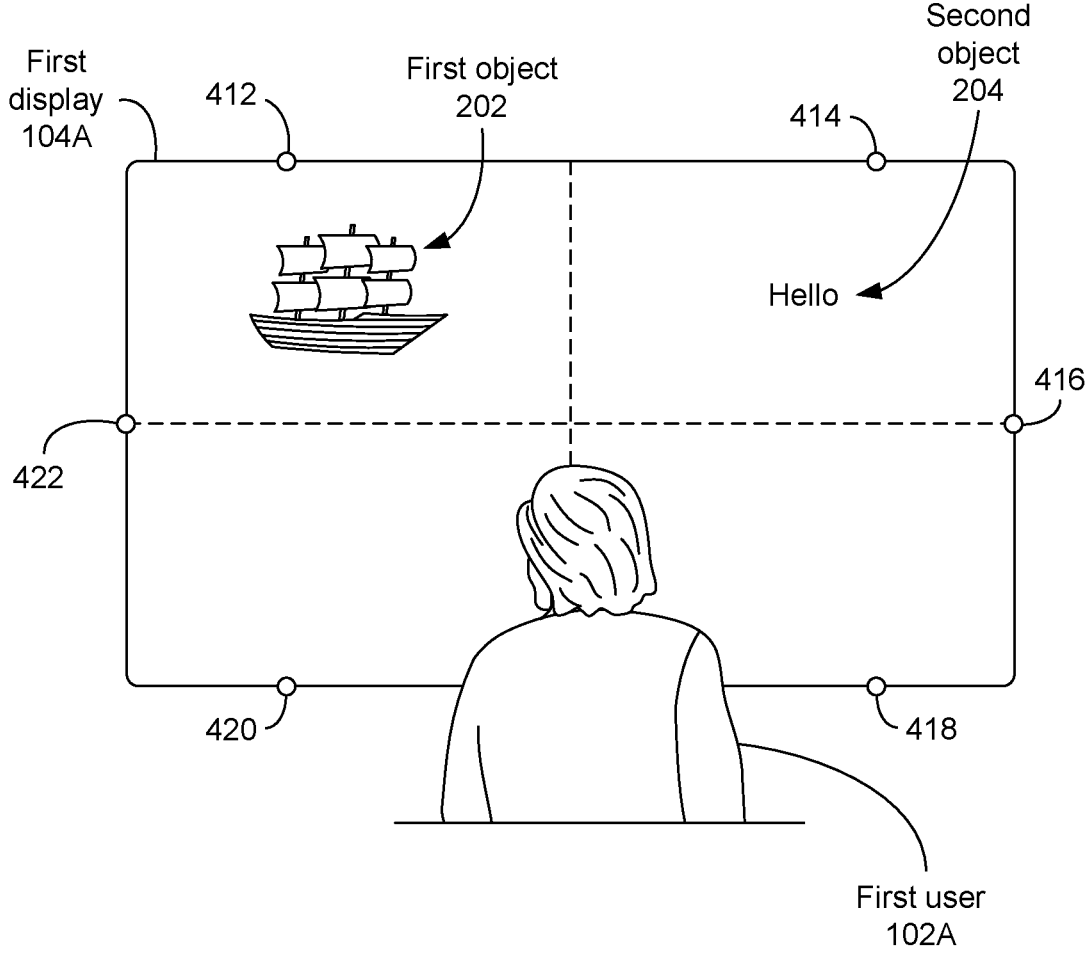
FIG. 4B shows the first user looking at the first display with the first display including a first object in an upper-left portion of the first display.

FIG. 4B shows the first user 102A looking at the first display 104A with the first display 104A including the first object 202 in an upper-left portion of the first display 104A. The upper-left portion of the first display 104A is similar to the upper-left section 212 of the first display 104A. FIG. 4B is a view from behind the first user 102A, showing the first user 102A from behind. In this example, the first user 102A is looking up and to the left at the first object 202.

The first computing device 106A (not shown) can include and/or be associated with multiple cameras 412, 414, 416, 418, 420, 422. While six cameras 412, 414, 416, 418, 420, 422 are shown in FIG. 4B, any number of cameras can be associated with and/or included in the first computing device 106A. Multiple cameras can provide multiple vantage points from which to capture images of a user such as the first user 102A. The multiple vantage points from which images are captured can enable the first computing device 106A, second computing device 106B, and/or server 110 to determine a direction of gaze of the user and/or generate a three-dimensional representation of user (such as an avatar).

Figure 4C:
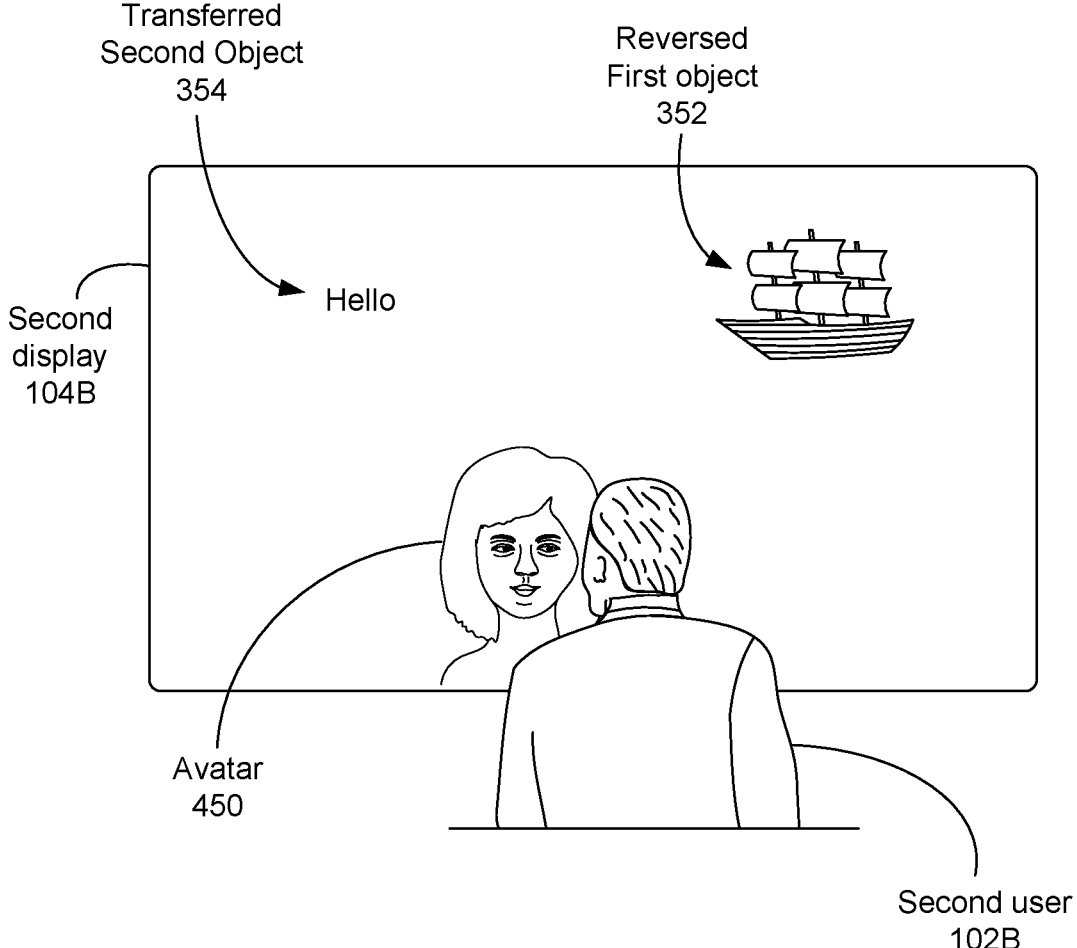
FIG. 4C shows the second display with a representation of the first user looking at the first object.

FIG. 4C shows the second display 104B with a representation of the first user 102A (not shown in FIG. 4C) looking at the first object (not shown in FIG. 4C). In the example shown in FIG. 4C, an avatar 450 represents the first user 102A. The avatar 450 may have been generated based on images of the user 102A captured by the cameras 412, 414, 416, 418, 420, 422, or may have been selected by the first user 102A and modified based on images of the user 102A captured by the cameras 412, 414, 416, 418, 420, 422. The second display 104B shows the avatar 450 looking at the reversed first object 352. The second display 104B shows the avatar 450 looking at the reversed first object 352 based on the determination that the first user 102A is looking up and to the left and/or at the first object 202.

Figure 5A:
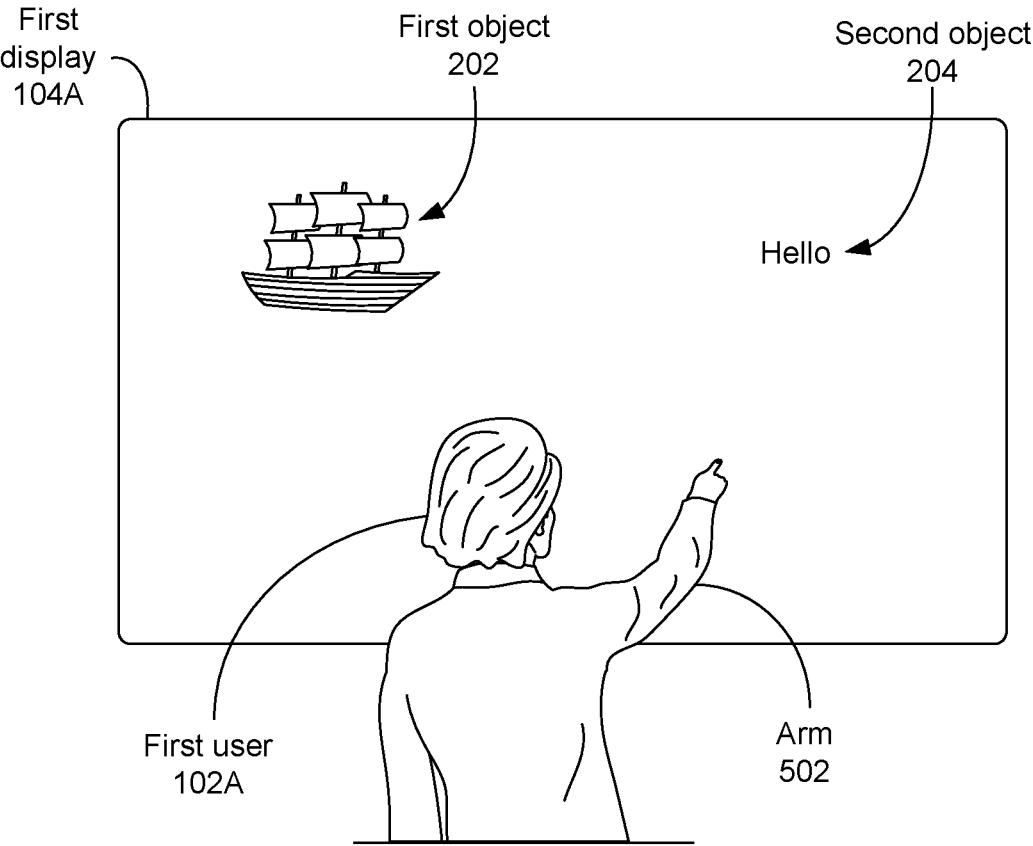
FIG. 5A shows the first user pointing at a second object that is in an upper-right portion of the first display.

FIG. 5A shows the first user 102A pointing at the second object 204 that is in an upper-right portion of the first display 104A. FIG. 5A is a view from behind the first user 102A, showing the first display 104A as well as the first user 102A in front of the first display 104A and pointing toward the second object 204 with an arm 502 and/or hand of the first user 102A. The second object 204 is in the upper-right portion of the first display 104A, which can be the upper-right section 214 and/or quadrant. Cameras (not shown in FIG. 5A), such as the cameras 412, 414, 416, 418, 420, 422 shown and described with respect to FIG. 4B, can capture images of the first user 102A pointing at the second object 204. Based on the images captured of the first user 102A pointing at the second object 204, the first computing device 106A, second computing device 106B, and/or server 110 can determine that the first user 102A is pointing at the second object 204 and/or to the upper right.

Figure 5B:
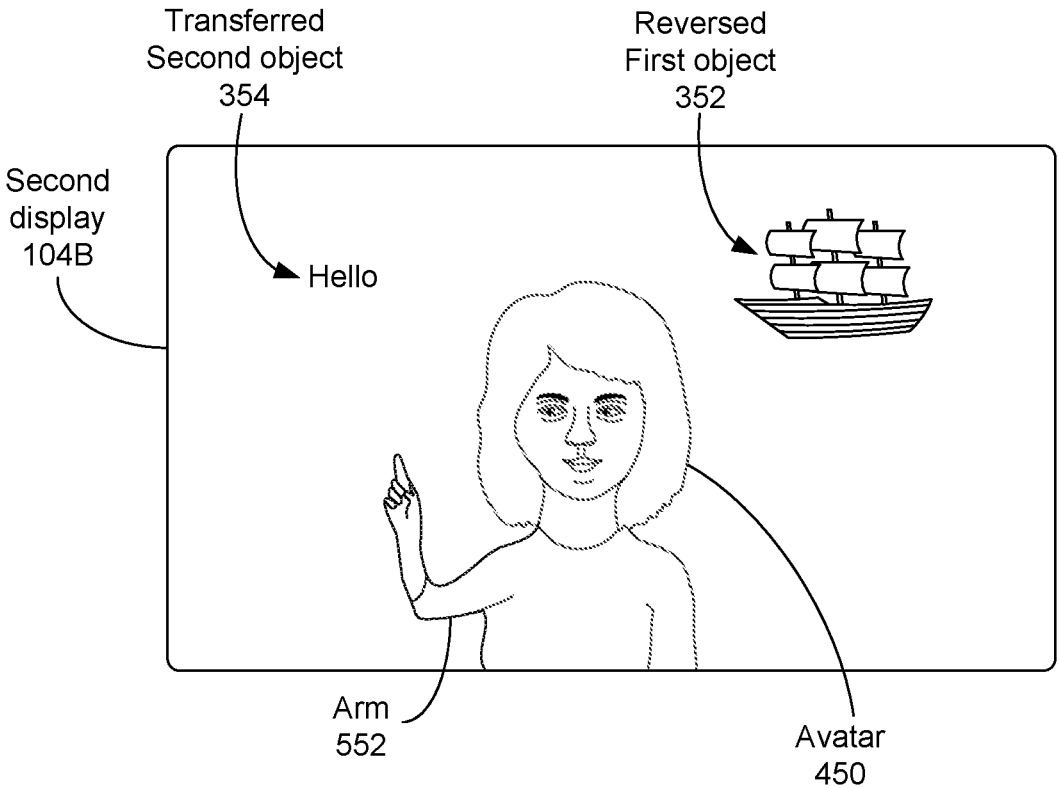
FIG. 5B shows the second display with a representation of the first user pointing at the second object.

FIG. 5B shows the second display 104B with a representation of the first user 102A (not shown in FIG. 5B) pointing at the second object 204 (not shown in FIG. 5B). The representation of the first user 102A can be considered an avatar 450. The avatar 450 can be generated based on the images captured of the first user 102A, or based on an avatar selected by the first user 102A and modified based on the images captured of the first user 102A. Based on the determination that the first user 102A is pointing at the second object 204 and/or to the upper right, the second display 104B shows an arm 552 of the avatar 450 pointing toward the transferred second object 354.

Figure 6A:
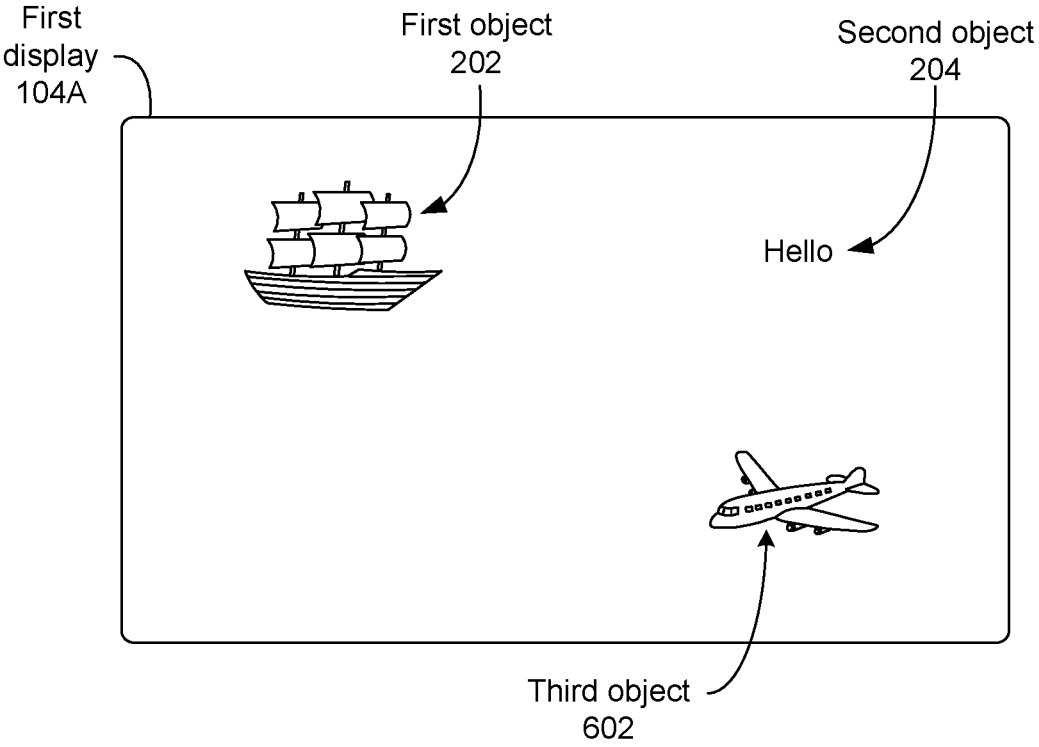
FIG. 6A shows the first display with a three-dimensional object.

FIG. 6A shows the first display 104A with a three-dimensional object. The three-dimensional object can be considered a third object 602. The third object 602 is presented by the first display 104A. The third object 602 can be considered three-dimensional based on being modeled to rotate along multiple axes, enabling a user to view the third object 602 from multiple perspectives. The first computing device 106A, second computing device 106B, and/or server 110 can determine that the third object 602 is a three-dimensional object based on attributes and/or properties of the third object 602, such as presence of vertices or a type identifier. In the example shown in FIG. 6A, the third object 602 is an airplane flying to the left, slightly down, and toward the user 102A (not shown in FIG. 6A).

Based on the determination that the third object 602 is a three-dimensional object, the first computing device 106A, second computing device 106B, and/or server 110 transfer a location of the third object 602, such as horizontally to an opposite horizontal position (similar to the horizontal transfer of location of the first object 202 and second object 204) and rotate the third object 602 about an axis to generate a rotated object. In some examples, the third object 602 is rotated one hundred eighty degrees (180°) about a vertical axis.

Figure 6B:
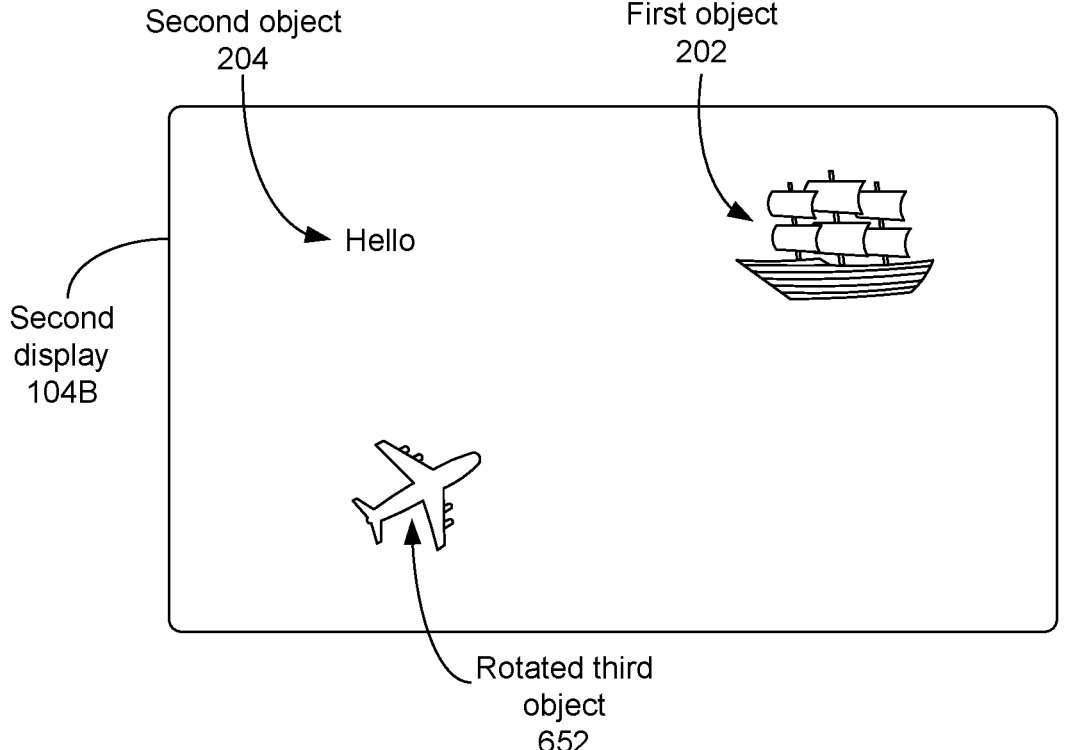
FIG. 6B shows the second display with a rotated representation of the three-dimensional object.

FIG. 6B shows the second display 104B with a rotated representation of the three-dimensional object. The rotated representation of the three-dimensional object can be considered a rotated third object 652 generated from the third object 602 based on the third object 602 being three-dimensional. The rotated third object 652 is based on the third object 602 being rotated one hundred eighty degrees (180°) about a vertical axis. While the third object 602 was flying to the left, slightly down, and toward the user, the rotated third object 652 is flying to the right, slightly up, and away from the user 102B (not shown in FIG. 6B).

Figure 7A:
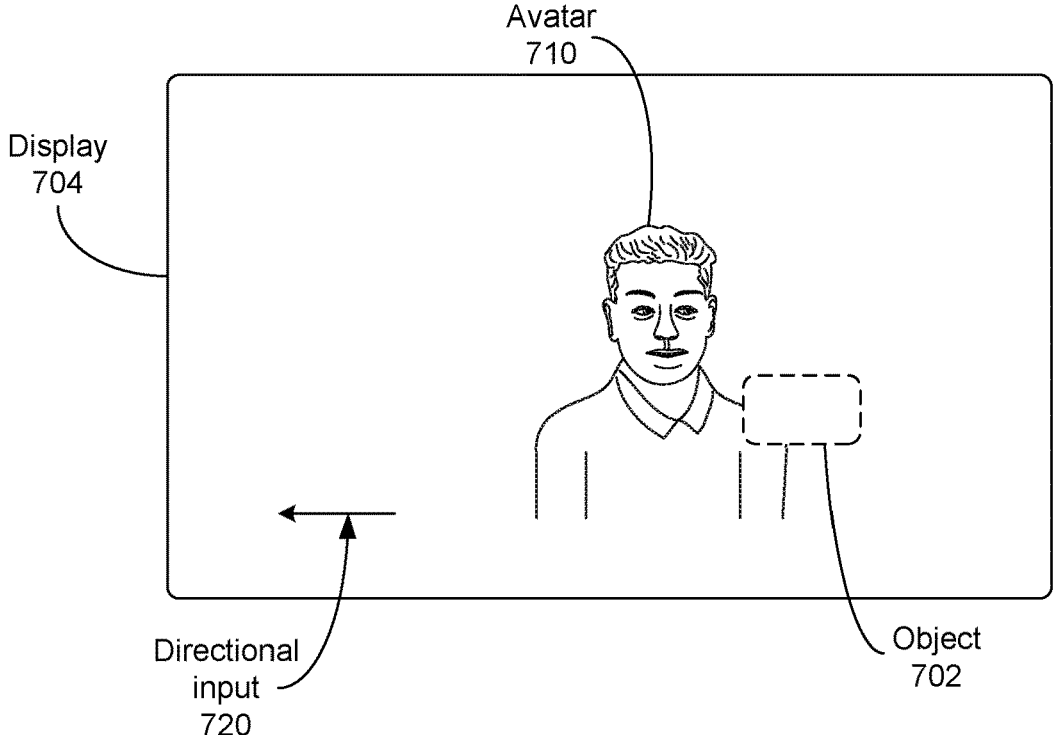
FIG. 7A shows a display with a representation of a user.

FIG. 7A shows a display 704 with a representation of a user. The display 704 can correspond to either of the displays 104A, 104B. The display 704 can present an avatar 710 that is a representation of a user of a computing device and/or display other than the display 704 and who is participating in a virtual conference with a user of the display 704. The avatar 710 can have similar features to the avatar 450.

A user of the display 704 may desire to move the avatar 710. The user of the display 704 may desire to move the avatar 710 because, for example, the avatar 710 is overlapping with an object 702 presented by the display 704 and the user of the display 704 desires an unobstructed view of the object 702. The object 702 can have properties of any of the objects 202, 204, 352, 354, 602, 652 described above. In some examples, the user of the display 704 can move the avatar 710 within the display 704 by providing directional input 720. In the example shown in FIG. 7A, the directional input 720 is directional input toward the left of the display 704. The user of the display 704 can provide the directional input by dragging a slide bar displayed by the display 704, with keyboard input, or by dragging the avatar 710, as non-limiting examples.

The user of the computing device and/or display other than the display 704 may have been determined to be looking and/or pointing at a particular object, as discussed above with respect to FIGS. 4A, 4B, 4C, 5A, and 5B. The avatar 710 may be looking and/or pointing at the object at which the user of the computing device and/or display other than the display 704 was determined to be looking and/or pointing. Movement of the avatar 710 could cause the avatar 710 to no longer look and/or point at the object. The enable the avatar 710 to continue looking and/or pointing at the object, the first computing device 106A, second computing device 106B, and/or server 110 can rotate the avatar 710.

Figure 7B:
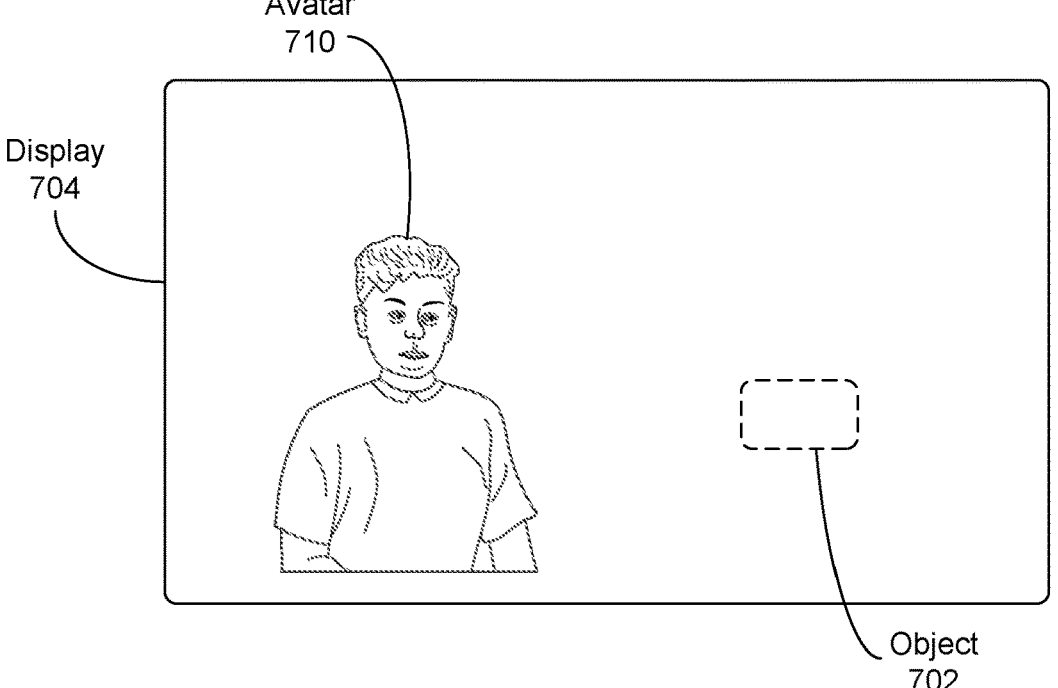
FIG. 7B shows the display of FIG. 7A with the representation of the user moved and rotated.

FIG. 7B shows the display of FIG. 7A with the representation of the user moved and rotated. The avatar 710 that represents the user of the computing device and/or display other than the display 704 has been moved to the left in response to the directional input 720 received from the user of the display 704. In response to the movement of the avatar 710 to the left, the avatar 710 has been rotated to cause the avatar 710 to look toward the left from the perspective of the avatar 710 or to the right from the perspective of the user of the display 704. In some examples, the avatar 710 was rotated about a vertical axis extending through a head and body of the avatar 710. The avatar 710 is now looking at a same object as the avatar 710 was looking at before the movement and rotation of the avatar 710, such as at the object 702. After the rotation, the avatar 710 can be considered a rotated avatar.

Figure 8:
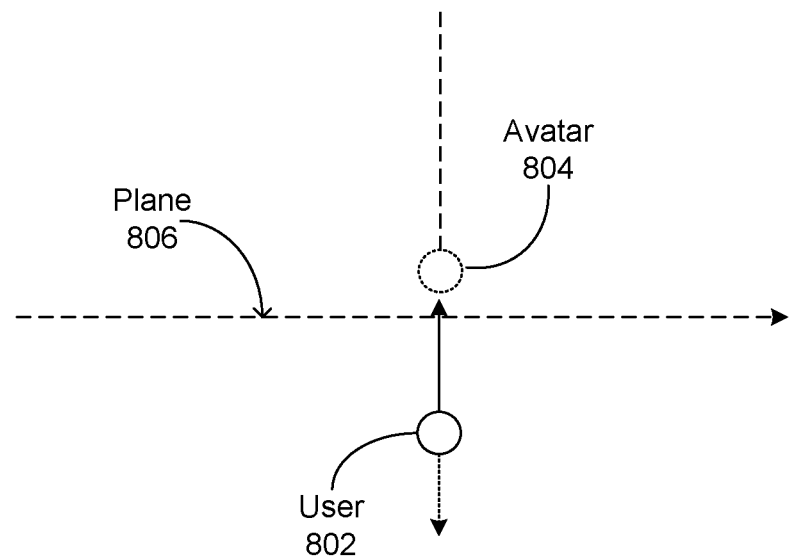
FIG. 8 is a diagram showing users participating in a virtual conference.

FIG. 8 is a diagram showing users participating in a virtual conference. A user 802 is viewing an avatar 804. A plane 806 represents a plane extending through a display that is presenting the avatar 804 to the user 802. The display can include either of the displays 104A, 104B discussed above. The user 802 can represent either of the users 102A, 102B. The avatar 804 can represent any of the avatars 450, 710. The presentation of the avatar 804 by the display causes the avatar 804 to appear to exist beyond the plane 806 of the display, such as within a display on which the display is mounted. The avatar 804 appears to be looking toward the user 802, and/or toward an object presented by the display.

Figure 9:
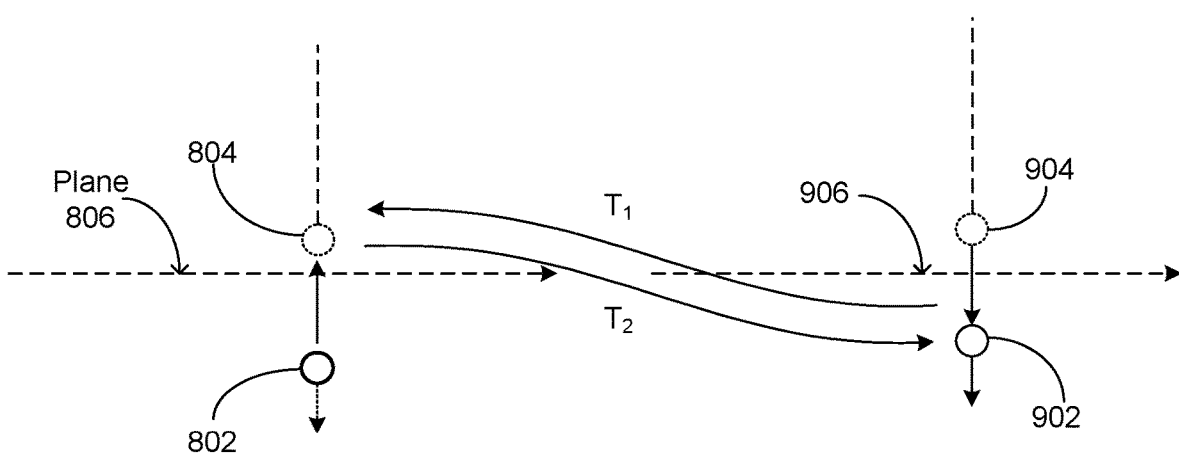
FIG. 9 is a diagram showing transformation of representations of users.

FIG. 9 is a diagram showing transformation of representations of users 802, 902. The first user 802, avatar 804, and plane 806 are as described with respect to FIG. 8. A second user 902 at a second station is viewing a second avatar 904 that represents the user 802. A plane 906 extends through a display that is presenting the second avatar 904 to the users 902. A first transformation T1 transforms the user 902 into the avatar 804. A second transformation T2 transforms the avatar 804 into a position within a virtual space and/or presentation of objects presented by the display seen by the users 902 so that the user 902 sees objects in the same positions as the user 802.

Figure 10:
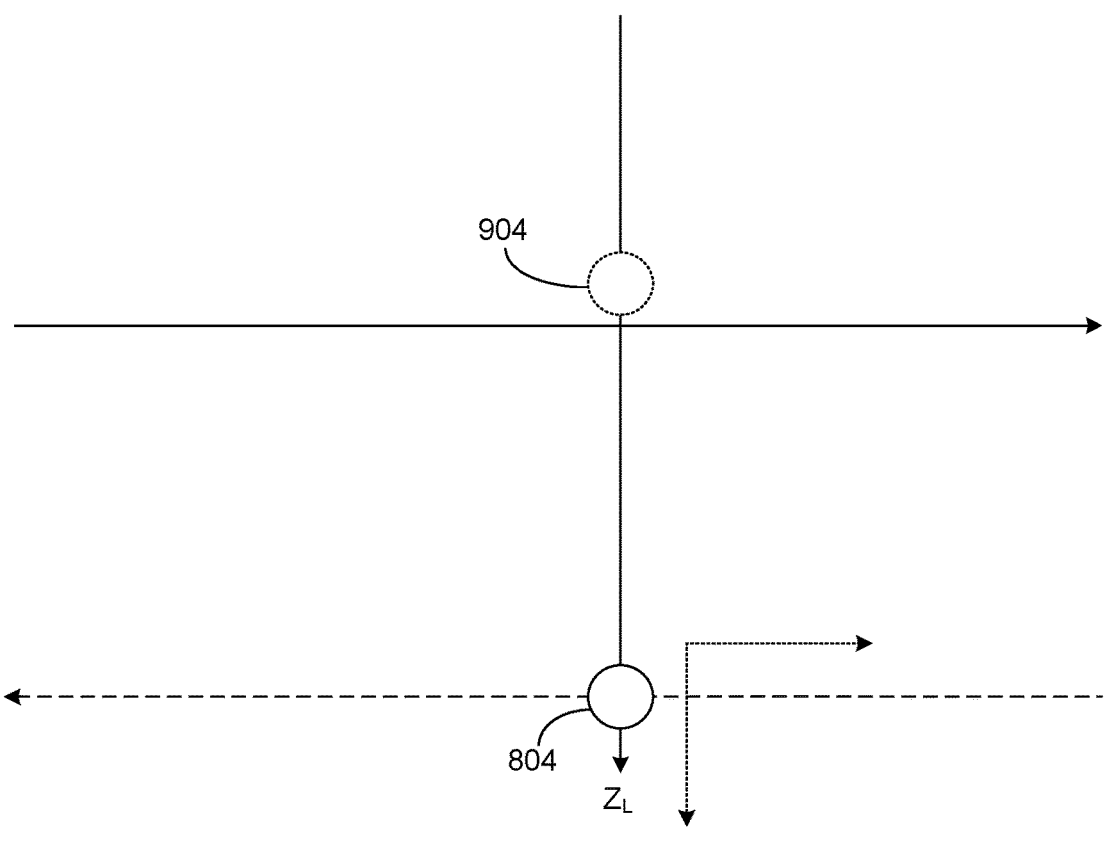
FIG. 10 is a diagram showing transformation of coordinates within a virtual conference.

FIG. 10 is a diagram showing transformation of coordinates within a virtual conference. When one of the avatars 804, 904 is moved, the avatar 804, 904 that is moved will rotate. The rotation causes the avatar 804, 904 to continue to look and/or point at the same object, as discussed above with respect to FIGS. 7A and 7B. A transformation of an avatar 804, 904 can be calculated as:

$$T = [R_y(\Psi)|t],$$

and an inverse transformation of an avatar 804, 904 can be calculated as:

$$T^{-1} = [R_y(-\Psi)|-R_y(-\Psi)t],$$

there T represents the transformation, $T^{-1}$ represents the inverse transformation, $R_y$ represents rotation about the y axis, $\Psi$ represents degrees of rotation, and t represents a translation in a z axis (shown as $Z_L$ in FIG. 10). A default value for $\Psi$ can be pi ($\pi$) or one hundred eighty degrees (180°). A default value for t can be [0, 0, 1.25] (in meters), where the first value (zero) represents movement in the x axis, the second value (zero) represents movement in the y axis, and the third value (1.25 meters) represents movement in the z axis.

Figure 11:
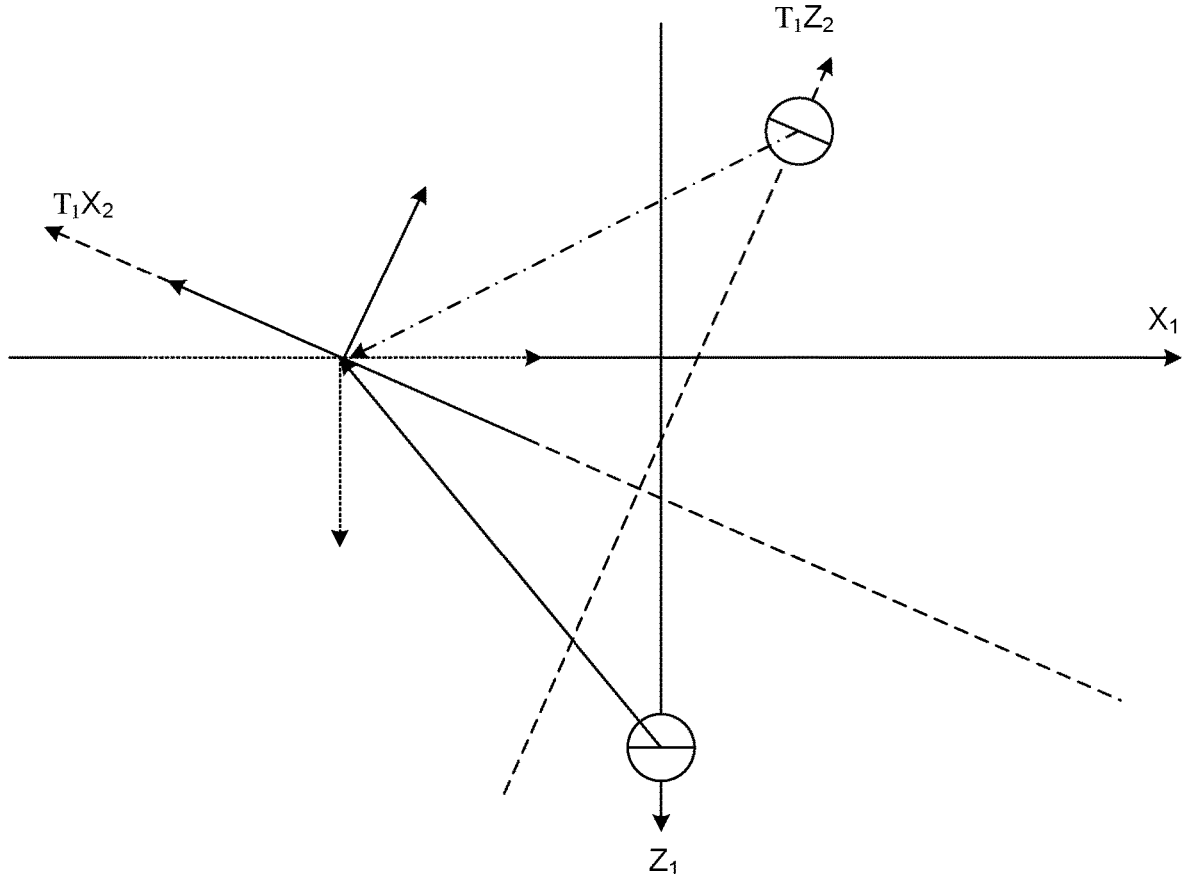
FIG. 11 is a diagram showing transformation of representations of users within a virtual conference.

FIG. 11 is a diagram showing transformation of representations of users within a virtual conference. FIG. 11 shows transformation of representations of users within the virtual conference from the perspective of a first user. FIG. 11 shows an avatar 804, 904 in an x-z plane. The transformation represents a change from a default configuration. The transformation of an avatar 804, 904 from images captured from a first user can be calculated as:

$$T_1=UT=[R_y(\pi+\theta)|t],$$

and the inverse transformation can be calculated as:

$$T_2=T_1^{-1}=TU^{-1}=[R_y(-\pi-\theta)|-R_y(-\pi-\theta)t],$$

where T and U represent default and additional transformations, where T is constrained such that $T=T^{-1}$.

Figure 12A:
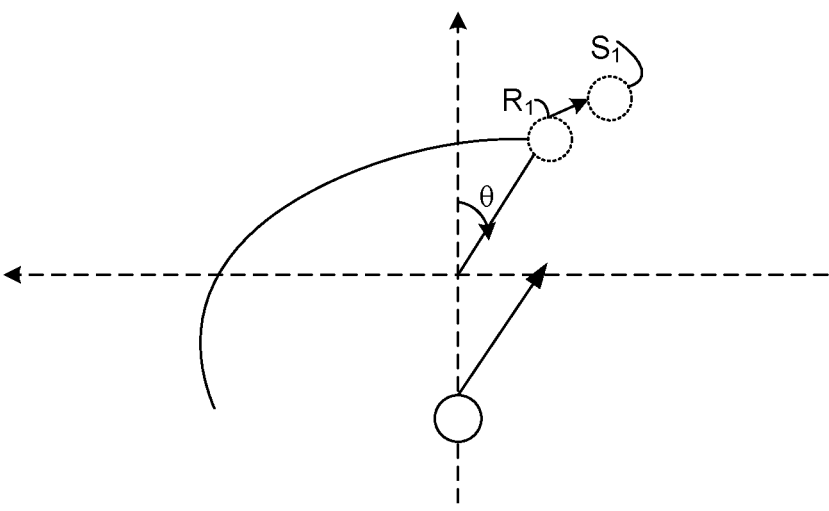
FIG. 12A is a diagram showing transformation of a representation of a first user within a virtual conference.

FIG. 12A is a diagram showing transformation of a representation of a first user within a virtual conference. $R_1$ represents a position of an avatar 804, 904 after a rotation of an avatar 804, 904 about a y axis clockwise, and $S_1$ represents a position of an avatar 804, 904 after a shift of the avatar in the x axis of z axis, by $s_x$ and $s_z$ respectively.

Figure 12B:
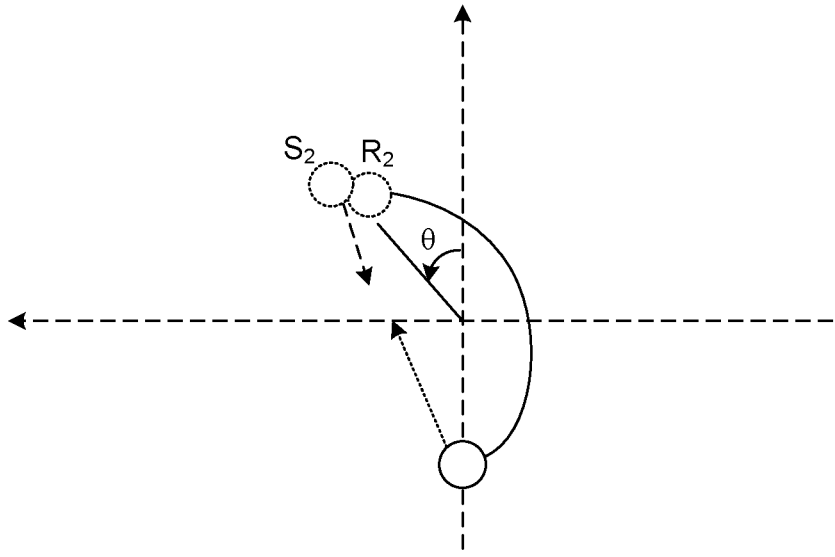
FIG. 12B is a diagram showing transformation of a representation of a second user within the virtual conference of FIG. 12A.

FIG. 12B is a diagram showing transformation of a representation of a second user within the virtual conference of FIG. 12A. $R_2$ represents a position of an avatar 804, 904 after a rotation of an avatar 804, 904 about a y axis counterclockwise, and $S_2$ represents a position of an avatar 804, 904 after a shift of the avatar in the x axis and z axis, by $t_x$ and $t_z$, respectively. The rotation and shift are chosen such that they form the inverse transformation of that in FIG. 12A. Arrows represent possible eye gazes of the user and avatar 804, 904. When $\theta$ is calculated as $\theta=2 \arctan(t_x/t_z)$, mirror symmetry can be achieved with FIG. 12A, i.e. $t_x=-s_x$ and $t_z=s_z$.

Figure 13:
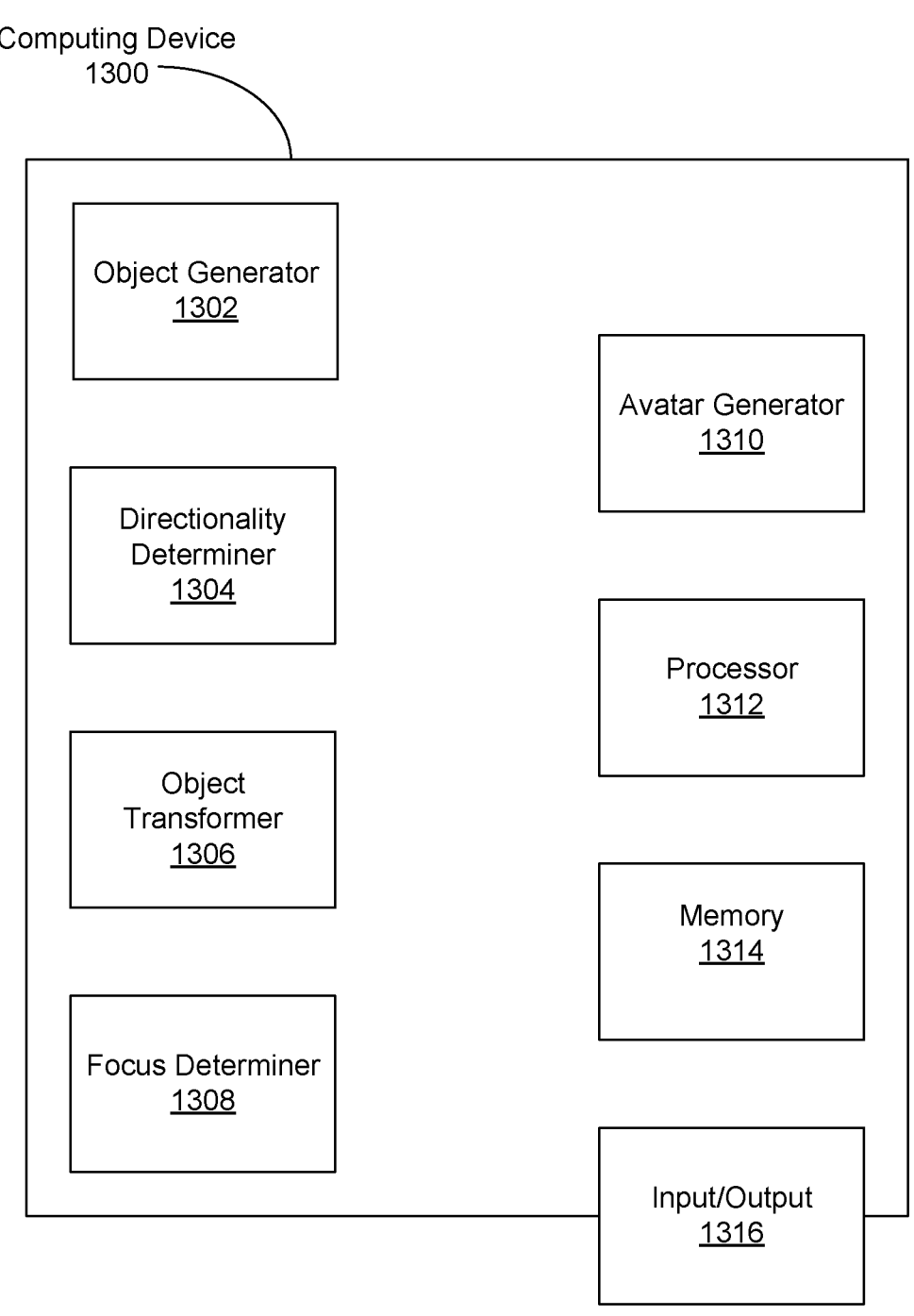
FIG. 13 is a block diagram of a computing device.

FIG. 13 is a block diagram of a computing device 1300. The computing device 1300 can represent any of the first computing device 106A, second computing device 106B, and/or server 110. The computing device 1300 can perform functions described with respect to the first computing device 106A, second computing device 106B, and/or server 110, and/or the computing device 1300 can represent the distribution of functions between the computing device 106A, second computing device 106B, and/or server 110.

The computing device 1300 can include an object generator 1302. The object generator 1302 can generate objects, such as the first object 202, second object 204, and/or third object 602. The object generator 1302 can generate objects in response to launching of, and/or instructions from, applications, or instructions from a user, as non-limiting examples.

The computing device 1300 can include a directionality determiner 1304. The directionality determiner 1304 can determine whether objects generated by the object generator 1302 are directional or non-directional. In some examples, the directionality determiner 1304 determines that objects are directional if the objects includes sequences of symbols and/or text. In some examples, the directionality determiner 1304 determines that objects are directional if similar images stored in a database are in a single direction at least a threshold proportion of the instances. In some examples, the directionality determiner 1304 determines that objects are non-directional if the objects do not include sequences of symbols and/or text. In some examples, the directionality determiner 1304 determines that objects are non-directional if similar images stored in a database are reversed at least a threshold proportion of instances.

The computing device 1300 can include an object transformer 1306. The object transformer 1306 can transform objects for presentation on a display that is associated with a virtual conference in which the objects were already displayed without transformation. If the objects are directional, then the object transformer 1306 can transform the objects by transferring locations of the objects, such as in a horizontal direction, without flipping or reversing the objects and/or while maintaining an orientation of the objects to generate transferred objects. If the objects are non-directional, then the object transformer 1306 can transform the objects by reversing an appearance and location of the objects to generate reversed objects. If the objects are three-dimensional, then the object transformer 1306 can transform the objects by rotating the objects about a vertical axis and horizontally transferring a location of the objects to generate rotated objects.

The computing device 1300 can include a focus determiner 1308. The focus determiner 1308 can determine an object and/or location at which a user is focusing. Focusing can include looking at an object or location with eyes of the user or pointing at an object or location with an arm, hand, and/or finger of the user. The focus determiner 1308 can determine the object and/or location at which the user is focusing based on images captured by cameras associated with a computing device that the user is associated with and/or interacting with.

The computing device 1300 can include an avatar generator 1310. The avatar generator 1310 can generate avatars to represent users who are participating in the virtual conference. The avatar generator 1310 can cause the avatars to appear to be looking, with eyes, at an object that the represented user is looking at. The avatar generator 1310 can cause the avatars to appear to be pointing, with an arm, hand, and/or finger, at an object that the represented user is pointing at. The avatar generator 1310 can cause the avatars to rotate in response to movement so that the avatars will continue to appear to be looking and/or pointing at a same object.

The computing device 1300 can include at least one processor 1312. The at least one processor 1312 can execute instructions, such as instructions stored in at least one memory device 1314, to cause the computing device 1300 to perform any combination of methods, functions, and/or techniques described herein.

The computing device 1300 can include at least one memory device 1314. The at least one memory device 1314 can include a non-transitory computer-readable storage medium. The at least one memory device 1314 can store data and instructions thereon that, when executed by at least one processor, such as the processor 1312, are configured to cause the computing device 1300 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 1300 can be configured to perform, alone, or in combination with the computing device 1300, any combination of methods, functions, and/or techniques described herein. The at least one memory device 1314 can include a gesture library. The gesture library can include predetermined gestures. The predetermined gestures can include hand formations and/or movements and associated actions.

The computing device 1300 may include at least one input/output node 1316. The at least one input/output node 1316 may receive and/or send data, such as from and/or to, a server, and/or may receive input and provide output from and to a user. The input and output functions may be combined into a single node, or may be divided into separate input and output nodes. The input/output node 1316 can include a microphone, multiple cameras (such as cameras to capture images of a user), a display, a speaker, one or more buttons, and/or one or more wired or wireless interfaces for communicating with other computing devices such as the first computing device 106A, second computing device 106B, and/or server 110.

Figure 14:
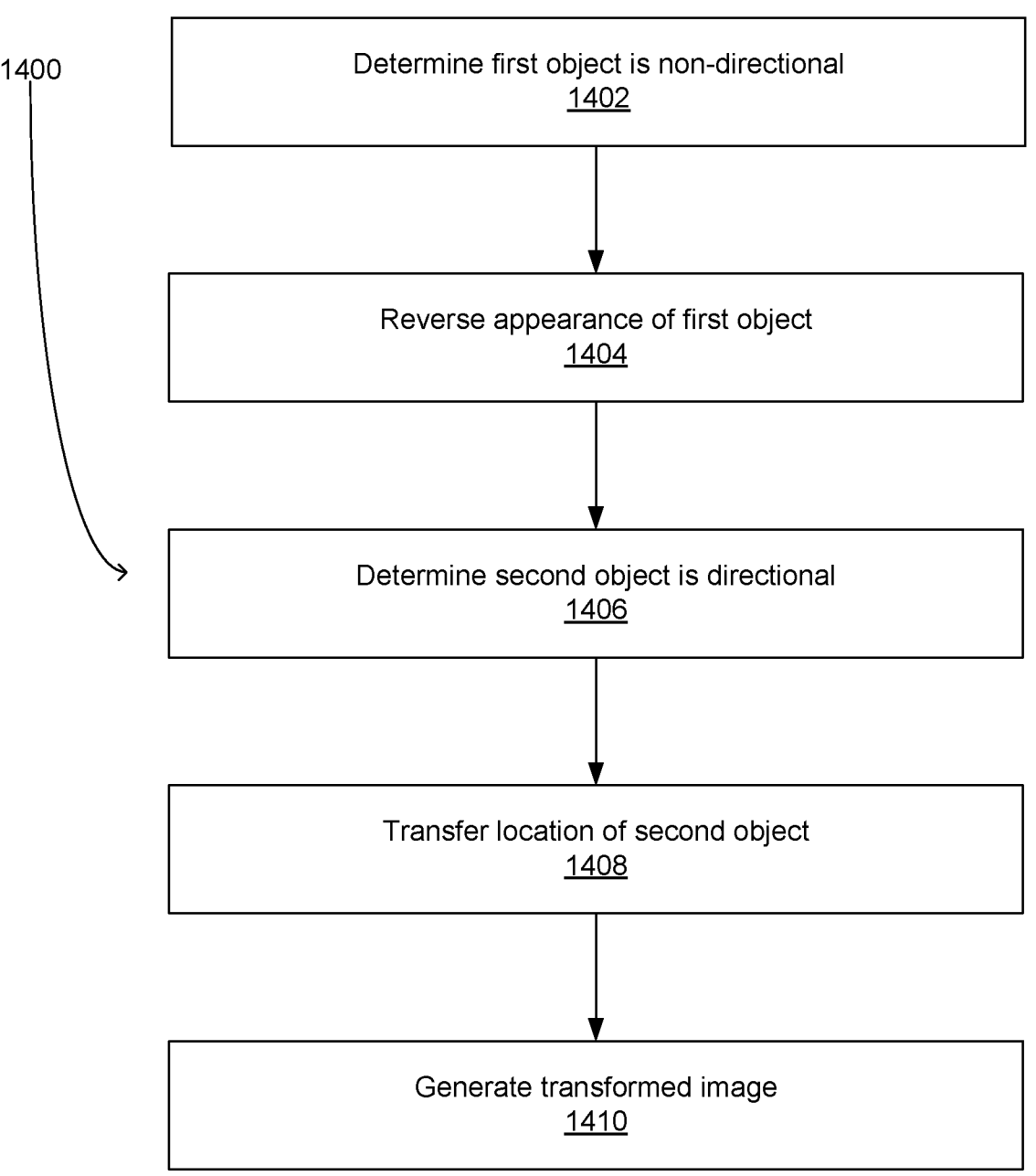
FIG. 14 is a flowchart showing a method performed by a computing device.

FIG. 14 is a flowchart showing a method 1400 performed by a computing device. The computing device that performs the method 1400 can include the computing device 1300. The method 1400 can include a method of facilitating a virtual conference. The method 1400 can include determining that a first object is non-directional (1402). Determining that the first object is non-directional (1402) can include determining that a first object is non-directional, the first object being presented within an original image on a first display within the virtual conference. The method 1400 can include reversing an appearance of the first object (1404). Reversing the appearance of the first object (1404) can include, based on determining that the first object is non-directional, reversing an appearance and a location of the first object to generate a reversed first object. The method 1400 can include determining that a second object is directional (1406). Determining that the second object is directional (1406) can include determining that a second object is directional, the second object being presented within the original image on the first display within the virtual conference. The method 1400 can include transferring a location of the second object (1408). Transferring the location of the second object (1408) can include, based on determining that the second object is directional, transferring a location of the second object while maintaining an orientation of the second object to generate a transferred second object. The method 1400 can include generating a transformed image (1410). Generating the transformed image (1410) can include causing a second display to generate a transformed image, the transformed image including the reversed first object and the transferred second object.

According to an example, the second object includes text.

According to an example, the method 1400 further includes determining that a third object is three-dimensional, the third object being presented within the original image on the first display within the virtual conference; and based on determining that the third object is three-dimensional, rotating the third object about an axis and transferring a location of the third object to generate a rotated object. The transformed image includes the reversed first object, the transferred second object, and the rotated third object.

According to an example, the method 1400 further includes determining that a user of the first display is looking at the first object; and generating an avatar, the avatar appearing to look toward a location of the reversed first object. The transformed image includes the reversed first object, the transferred second object, and the avatar.

According to an example, the method 1400 further includes determining that a user of the first display is pointing at the second object; and generating an avatar, the avatar appearing to point toward a location of the transferred second object. The transformed image includes the reversed first object, the transferred second object, and the avatar.

According to an example, the method 1400 further includes determining a direction that a user of the first display is looking; and rotating an avatar based on the direction to generate a rotated avatar. The transformed image includes the reversed first object, the transferred second object, and the rotated avatar.

According to an example, the method 1400 further includes determining a direction that a user of the second display is looking; receiving an instruction to move an avatar, the avatar representing the user of the second display; and in response to receiving the instruction to move the avatar, moving the avatar within the first display, and rotating the avatar based on the direction and the instruction.

According to an example, reversing the appearance and the location of the first object to generate the reversed first object includes subtracting horizontal values of pixels included in the first object from a predetermined value.

According to an example, transferring the location of the second object while maintaining an appearance of the second object to generate the transferred second object includes determining a section of the first display that includes the location of the second object; and determining a section of the second display to include the location of the transferred second object, the section of the second display being flipped horizontally from the section of the first display.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of facilitating a virtual conference, the method comprising:
   determining that a first object is non-directional, the first object being presented within an original image on a first display within the virtual conference;
   based on determining that the first object is non-directional, reversing an appearance and a location of the first object to generate a reversed first object;
   determining that a second object is directional, the second object being presented within the original image on the first display within the virtual conference;
   based on determining that the second object is directional, transferring a location of the second object while maintaining an orientation of the second object to generate a transferred second object;
   causing a second display to generate a transformed image, the transformed image including the reversed first object and the transferred second object;
   determining that a user of the first display is focusing on the first object; and
   generating a representation of the user, the representation of the user appearing to focus on the reversed first object, the transformed image including the representation of the user.

2. The method of claim 1, wherein the second object includes text.

3. The method of claim 1, further comprising:
   determining that a third object is three-dimensional, the third object being presented within the original image on the first display within the virtual conference; and
   based on determining that the third object is three-dimensional, rotating the third object about an axis and transferring a location of the third object to generate a rotated object,
   the transformed image including the reversed first object, the transferred second object, and the rotated third object.

4. The method of claim 1, wherein:
   determining that the user of the first display is focusing on the first object includes determining that the user of the first display is looking at the first object,
   generating the representation of the user includes generating an avatar, the avatar appearing to look toward a location of the reversed first object, and
   the representation of the user includes the avatar.

5. The method of claim 1, wherein:
   determining that the user of the first display is focusing on the first object includes determining that the user of the first display is pointing at the second object,
   generating the representation of the user includes generating an avatar, the avatar appearing to point toward a location of the transferred second object, and
   the representation of the user includes the avatar.

6. The method of claim 1, wherein:
   determining that the user of the first display is focusing on the first object includes determining a direction that the user of the first display is looking,
   generating the representation of the user includes rotating an avatar based on the direction to generate a rotated avatar, and
   the representation of the user includes the rotated avatar.

7. The method of claim 1, further comprising:
   determining a direction that a user of the second display is looking;
   receiving an instruction to move an avatar, the avatar representing the user of the second display; and
   in response to receiving the instruction to move the avatar:
      moving the avatar within the first display; and
      rotating the avatar based on the direction and the instruction.

8. The method of claim 1, wherein reversing the appearance and the location of the first object to generate the reversed first object includes subtracting horizontal values of pixels included in the first object from a predetermined value.

9. The method of claim 1, wherein transferring the location of the second object while maintaining an appearance of the second object to generate the transferred second object includes:
   determining a section of the first display that includes the location of the second object; and
   determining a section of the second display to include the location of the transferred second object, the section of the second display being flipped horizontally from the section of the first display.

10. A non-transitory computer-readable storage medium comprising instructions stored thereon for facilitating a virtual conference, the instructions, when executed by at least one processor, being configured to cause a computing device to:

determine that a first object is non-directional, the first object being presented within an original image on a first display within the virtual conference;

based on determining that the first object is non-directional, reverse an appearance and a location of the first object to generate a reversed first object;

determine that a second object is directional, the second object being presented within the original image on the first display within the virtual conference;

based on determining that the second object is directional, transfer a location of the second object without reversing the second object to generate a transferred second object;

cause a second display to generate a transformed image, the transformed image including the reversed first object and the transferred second object;

determine that a user of the first display is focusing on the first object; and generate a representation of the user, the representation of the user appearing to focus on the reversed first object, the transformed image including the representation of the user.

11. The non-transitory computer-readable storage medium of claim 10, wherein the second object includes text.

12. The non-transitory computer-readable storage medium of claim 10, wherein the instructions are further configured to cause the computing device to:

determine that a third object is three-dimensional, the third object being presented within the original image on the first display within the virtual conference; and based on determining that the third object is three-dimensional, rotate the third object about an axis and transferring a location of the third object to generate a rotated object, the transformed image including the reversed first object, the transferred second object, and the rotated third object.

13. The non-transitory computer-readable storage medium of claim 10, wherein:

determining that the user of the first display is focusing on the first object includes determining that the user of the first display is looking at the first object, generating the representation of the user includes generating an avatar, the avatar appearing to look toward a location of the reversed first object, and the representation of the user includes the avatar.

14. The non-transitory computer-readable storage medium of claim 10, wherein:

determining that the user of the first display is focusing on the second object includes determining that the user of the first display is pointing at the second object, generating the representation of the user includes generating an avatar, the avatar appearing to point toward a location of the transferred second object, and the representation of the user includes the avatar.

15. The non-transitory computer-readable storage medium of claim 10, wherein:

determining that the user of the first display is focusing on the first object includes determining a direction that the user of the first display is looking, generating the representation of the user includes rotating an avatar based on the direction to generate a rotated avatar, and the representation of the user includes the rotated avatar.

16. The non-transitory computer-readable storage medium of claim 10, wherein the instructions are further configured to cause the computing device to:

determine a direction that a user of the second display is looking;

receive an instruction to move an avatar, the avatar representing the user of the second display; and in response to receiving the instruction to move the avatar:

move the avatar within the first display; and rotate the avatar based on the direction and the instruction.

17. The non-transitory computer-readable storage medium of claim 10, wherein reversing the appearance and the location of the first object to generate the reversed first object includes subtracting horizontal values of pixels included in the first object from a predetermined value.

18. The non-transitory computer-readable storage medium of claim 10, wherein transferring the location of the second object without reversing the second object to generate the transferred second object includes:

determining a section of the first display that includes the location of the second object; and determining a section of the second display to include the location of the transferred second object, the section of the second display being flipped horizontally from the section of the first display.

19. A computing device comprising:

at least one processor; and a non-transitory computer-readable storage medium comprising instructions stored thereon that, when executed by the at least one processor, are configured to cause the computing device to:

determine that a first object is non-directional, the first object being presented within an original image on a first display;

based on determining that the first object is non-directional, reverse an appearance and a location of the first object to generate a reversed first object;

determine that a second object is directional, the second object being presented within the original image on the first display;

based on determining that the second object is directional, transfer a location of the second object without reversing the second object to generate a transferred second object;

cause a second display to generate a transformed image, the transformed image including the reversed first object and the transferred second object;

determine that a user of the first display is focusing on the first object; and generate a representation of the user, the representation of the user appearing to focus on the reversed first object, the transformed image including the representation of the user.

20. The computing device of claim 19, wherein:

determining that the user of the first display is focusing on the first object includes determining a direction that a user of the second display is looking; and the instructions are further configured to cause the computing device to respond to an instruction to move an avatar, the avatar representing the user of the second display, by:

moving the avatar within the first display; and rotating the avatar based on the direction and the instruction.

* * * * *